(12) United States Patent
Teschner et al.

(10) Patent No.: US 7,144,464 B2
(45) Date of Patent: Dec. 5, 2006

(54) PROCESS FOR PRODUCING A CURVED PANE ARRANGEMENT FOR A MOTOR VEHICLE

(75) Inventors: Helmut Teschner, Landsberg/Lech (DE); Hubert Boehm, Greifenberg (DE); Gerit Erbeck, Niederneuching (DE)

(73) Assignee: Webasto AG, Stockdorf (DE)

( * ) Notice: Subject to any disclaimer, the term of this patent is extended or adjusted under 35 U.S.C. 154(b) by 40 days.

(21) Appl. No.: 10/847,290

(22) Filed: May 18, 2004

(65) Prior Publication Data

US 2004/0231778 A1 Nov. 25, 2004

(30) Foreign Application Priority Data

May 22, 2003 (DE) ................. 103 23 234

(51) Int. Cl.
*B32B 37/10* (2006.01)
(52) U.S. Cl. .............. 156/102; 156/104; 156/105; 156/285; 156/286
(58) Field of Classification Search .............. None
See application file for complete search history.

(56) References Cited

U.S. PATENT DOCUMENTS 3,806,387 A  4/1974  Peetz et al.
3,808,077 A * 4/1974  Rieser et al. ............... 156/102
3,960,627 A  6/1976  Halberschmidt et al.
4,180,426 A * 12/1979  Oustin et al. ............... 156/104
4,944,822 A * 7/1990  Ishikawa et al. ............ 156/212
5,622,580 A  4/1997  Mannheim
5,631,089 A  5/1997  Center, Jr. et al.
6,843,953 B1 * 1/2005  Filsinger et al. ............ 264/510

FOREIGN PATENT DOCUMENTS

WO    WO 01/68353    * 9/2001

* cited by examiner

*Primary Examiner*—Jessica Rossi
(74) *Attorney, Agent, or Firm*—David S. Safran

(57) ABSTRACT

A process for producing an arched pane arrangement for a motor vehicle, using a flexible die (24), a plastic film (22) being pressed onto the arched glass pane (18) in order to form a film combination (26) and the film combination being subjected to heat treatment at an pressure which is below atmospheric pressure in order to laminate the plastic film onto the pane. The die (24) is thin glass or a metal foil with a layer thickness of less than 1 mm each.

2 Claims, 5 Drawing Sheets

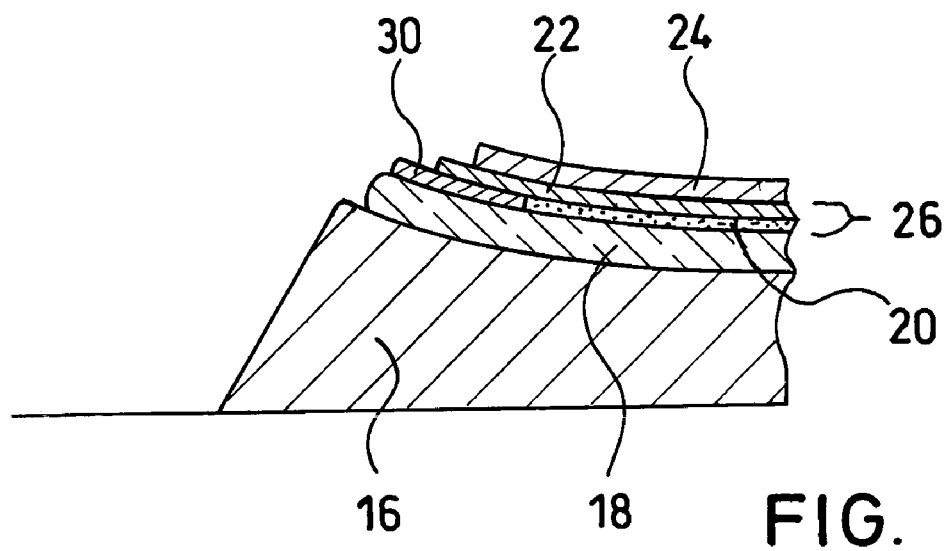
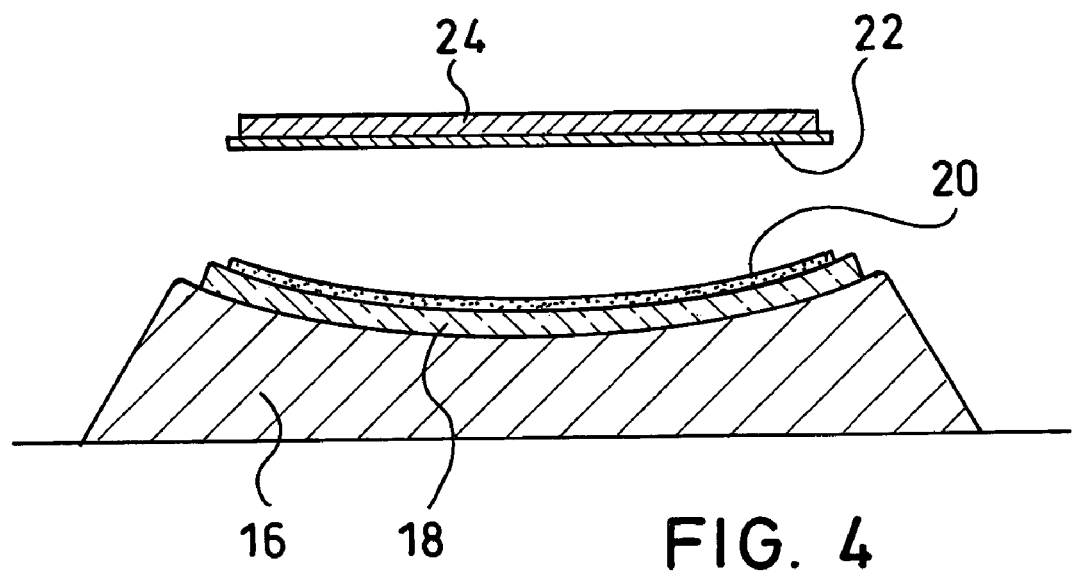

PROCESS FOR PRODUCING A CURVED PANE ARRANGEMENT FOR A MOTOR VEHICLE

BACKGROUND OF THE INVENTION

1. Field of the Invention

This invention relates to a process for producing an arched pane arrangement for a motor vehicle by means of a flexible die.

2. Description of Related Art

Such a generic process is described in U.S. Pat. No. 5,622,580 where a curved glass pane for a motor vehicle roof is laminated by means of an adhesive layer of polyvinyl butyryl with an anti-lacerative layer of polyester or polycarbonate by the anti-lacerative layer being pressed onto the glass pane in an autoclave process by means of a rigid die of polycarbonate or metal or a flexible die of glass fiber material, and then, the series of layers being evacuated and laminated by means of pressure and heat treatment. After completed lamination the die which does not adhere to the anti-lacerative layer is removed again.

A similar process is described in U.S. Pat. No. 3,806,387 where a glass pane for a motor vehicle is produced by pressing an adhesive layer and a transparent plastic layer onto a curved glass pane by means of a glass die which has the same shape as the glass pane in order to form a series of layers which is laminated onto the glass pane in an autoclave. After completed lamination, the glass die is removed again. The glass die has a thickness of 3 mm and is preformed, i.e. rigid.

U.S. Pat. No. 3,960,627 describes another generic process, here, an elastic die of silicone rubber with a thickness of 1–3 mm is used to press a plastic layer onto the glass pane. The lamination process is then carried out in a vacuum bag in an autoclave, a soft damping material being inserted between the die and the inside wall of the vacuum bag.

U.S. Pat. No. 5,631,089 discloses a process for producing a flat glass pane, a polymer film being laminated onto a flat glass pane by means of an adhesive layer by the polymer film first being provided on one side with a relatively soft polyethylene layer, and then, the combination of layers being pressed onto the glass pane by means of a die which presses against the polyethylene layer. Then, lamination takes place in a vacuum bag in an autoclave at a pressure of 2–30 atm. After completed lamination, first the die and then the polyethylene layer are removed. The polyethylene layer is used to embed impurity particles on the surface of the polymer film and to entrain them when the polyethylene layer is removed. In one alternative embodiment, the polyethylene layer is not applied to the polymer film, but to the side of the die facing the combination of layers.

SUMMARY OF THE INVENTION

A primary object of the present invention is to devise a process for producing an arched pane arrangement with a combination of films for a motor vehicle in which good optical quality of the laminate can be achieved in a simple and economical manner.

The object is achieved as claimed in accordance with the invention by a process in using a flexible die formed of thin glass or a metal foil with a layer thickness of less than 1 mm, by which a plastic film is pressed onto the arched glass pane in order to form a film combination and the film combination is subjected to heat treatment at a pressure which is below atmospheric pressure in order to laminate the plastic film onto the pane. By using thin glass or a metal foil with a layer thickness of less than 1 mm as the die good, optical quality of the laminate can be easily and economically obtained.

Another process in accordance with the invention is because the heat treatment is carried out in a laminator, good optical quality of the laminate can be easily achieved especially when a die of thin glass or metal foil with a layer thickness of less than 1 mm each is used.

In accordance with another aspect of the invention, the film combination is subjected to heat treatment at a pressure which is below atmospheric pressure in order to laminate the plastic film onto the pane, the heat treatment being carried out in a laminator. Because the plastic film is stretched during heat treatment, force being applied in the edge area of the plastic film, it can be ensured that the plastic film to be laminated is stretched when the plastic film is pressed by means of the die in order to achieve good optical quality of the laminate. Preferably, for this purpose, the edge area of the plastic film are clamped around the die before heat treatment, there being a stretching device which presses the film in an area near the edge area as a result of the pressure drop into a recess in the die in order to pretension the film before heat treatment.

In accordance with another aspect of the process of the invention, the lamination taking place in two stages, specifically first with a die with a textured surface, in order to enable good outflow of air between the die and the film combination during evacuation, and then final lamination takes place with a second die with a smooth surface, the textures stamped by the textured die into the film combination being removed again by a second die. In this way, air inclusions can be avoided without the optical quality of the laminate having to suffer.

One alternative approach according to the invention is to insert a nonadhesive layer with a surface microstructure between the film combination and the die in order to facilitate the discharge of air from the area between the die and the film combination, but the surface microstructure of the inserted layer being so fine that it does not show on the film combination. Materials can be especially hard, but also fine textile fabric, for example, crisp silk.

In yet another alternative approach, the peripheral edges of the film combination and the die are covered with strips of glass fiber mat before the pressure is reduced in order to facilitate air discharge between the pane and the plastic film. This represents a simple measure for avoiding the inclusion of air bubbles between the pane and the plastic film.

In accordance with yet another aspect of the invention, as a version of the approaches described so far, the plastic film is applied to the die before pressure reduction and lamination. In this way, the handling of the plastic film may be facilitated, in particular care being take for stretching the plastic film during the lamination process in this way.

Still further, in accordance with the invention, before lamination, the plastic film is provided with a lining layer which can be removed after lamination. In this way if necessary impurity particles can be easily kept away from the plastic film and removed.

One alternative process which likewise solves this latter problem is to provide the die with an elastic coating on the side facing the plastic film. In this way, if necessary, impurity particles can also be kept away from the plastic film and removed.

In the initially described approach of the invention, preferably alkali-free thin glass is used which is preferably chemically hardened before use as a die. In order to prevent electrostatic attraction of dust particles, the die can be thin glass which, before use as the die, is coated on the side facing the plastic film with a metal layer which can be electrically grounded. In order to prevent adhesion of the die to the plastic film, so that lateral displacement of the die on the plastic film is enabled, the die can be thin glass which is provided with a so-called nanocoating (so-called "lotus effect" coating) on the side facing the plastic film before use as a die.

Further details of the invention will become apparent from the following description in combination with the accompanying drawings.

BRIEF DESCRIPTION OF THE DRAWINGS

FIG. 3 is an enlarged view of the left edge area of the pane with the films from FIG. 1 applied in a manner that is modified as compared to FIG. 1;

FIG. 4 is a view like FIG. 1, of an embodiment of the die which has been modified compared to FIG. 1, prior to placement on the film stack;

DETAILED DESCRIPTION OF THE INVENTION

Figure 1:
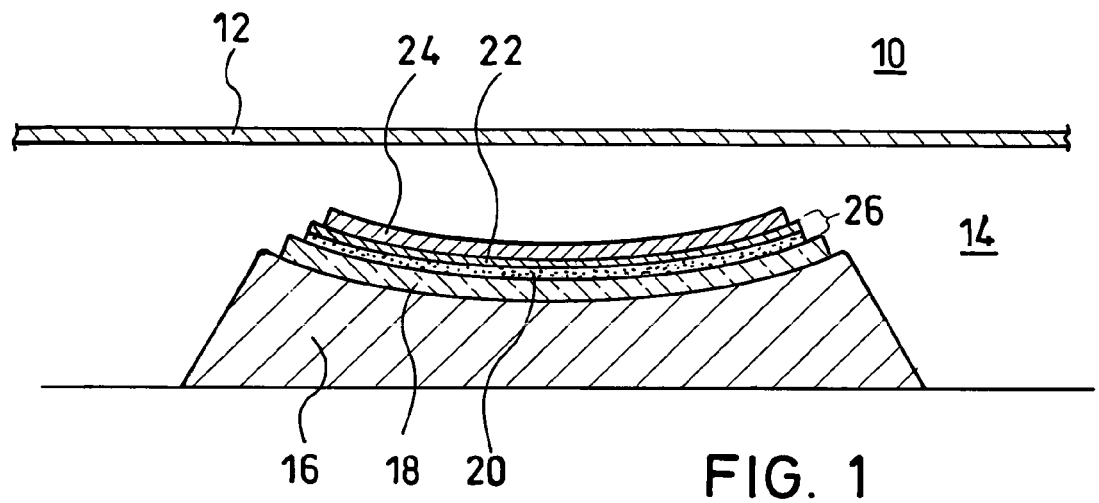
FIG. 1 shows a schematic sectional view of a pane which has been placed on a lower mold with the films applied and the die applied in a laminator before closing the laminator.

FIG. 1 shows a laminator which has an upper chamber 10 and a lower chamber 14 which is separated from it by means of a membrane 12. In the lower chamber 14, there is a concave lower mold 16 which is made preferably of metal. An arched glass pane 18 is inserted into the convex depression of the lower mold 16 and an adhesive layer 20, which is preferably a hot-melt adhesive film, is in turn applied to the glass pane. The hot-melt adhesive film 20 is used to join a plastic cover film 22, which has been placed on the adhesive layer, to the pane 18. In turn, a flexible die 24 is placed on the cover film 22 and covers at least the middle area of the pane 18 or the film combination formed by the films 20, 22.

The lower mold 16 can be heatable in order to achieve good and defined temperature control of the lamination process. The arch of the lower mold 16 can correspond to the arch of the glass pane 18 or can be less than that of the pane 18.

The glass pane 18 is arched, preferably spherically or double-cylindrically, and is produced from tempered glass. In the laminated state, the pane arrangement can then be used as a transparent roof element, for example, as a movable transparent cover of an openable motor vehicle roof or as a fixed glass element or as a front window, rear window, or side window of a motor vehicle.

The adhesive layer 18 is preferably made as a hot-melt adhesive film of polyurethane (PU), PVB or EVA.

The cover film 24 can be produced, for example, from PET or polycarbonate (PC) or PMMA and can be used, for example, to protect against shards in the case of breakage of the glass pane 18, or to protect electrical operating elements or working layers provided on the pane against mechanical stress (for example, shearing off) and environmental effects.

Both the pane 18 and also the film combination 26 are preferably transparent or translucent.

The die 24 is made of thin glass or a metal foil, each with a layer thickness of less than 1 mm. If it is thin glass, preferably alkali-free thin glass is used which can be chemically hardened in order to combine sufficient flexibility of the die with sufficient hardness. In particular, the thin glass can be so-called display glass which is conventionally used in electronic displays. The side of the thin glass die facing the film combination 26 can be coated with a metal layer which can be electrically grounded in order to prevent the electrostatic attraction of dust particles before pressing onto the film combination 26. A die 24 which has been coated in this way is shown schematically in FIG. 6, the coating bearing reference number 28. However, the coating 28 of the die 24 can be a so-called nanocoating which is designed to prevent adhesion of the die 24 to the film combination 26 during the lamination process so that lateral displacement of the die 24 on the film combination 26 is possible during the lamination process. These coatings which act as anti-adhesion coatings are also called "lotus effect" coatings and are known.

When the die 24 is made as a metal foil, it is preferably polished to a high gloss in order to ensure the corresponding surface quality of the film combination 26 after lamination. The materials can be, for example, aluminum, brass or spring steel. Furthermore, the side of the metal foil facing the film combination 26 can be coated in a suitable manner, for example, plated with shiny nickel.

To carry out the lamination process, proceeding from the position shown in FIG. 1 in which the lower chamber 14 of the laminator is not yet sealed airtight by the membrane 12, the membrane 12 is lowered until the lower chamber 14 is sealed airtight. Then, both the upper chamber 12 and also the lower chamber 14 are evacuated. In doing so, especially the air between the film combination 26 and the pane 18, as well as between the die 24 and the film combination 26, will be completely removed since residual air inclusions have a very disruptive effect on the optical appearance of the laminate. The negative pressure used can be, for example, a fine vacuum of, for example, 50 mbar. Other measures to achieve this air discharge as effectively as possible are described below.

If a sufficient vacuum has been achieved in the lower chamber 14, the upper chamber 10 is ventilated, i.e., brought to atmospheric pressure, while the lower chamber 14 is further evacuated. In this way, an overpressure of roughly 1 bar is achieved with respect to the lower chamber 14 so that the membrane 12 presses with this pressure on the top of the die 24, by which the underside of die 24 is pressed against the film combination 26. At the same time, then, the actual lamination process is begun by heating the film combination 26 to an elevated temperature. This can take place, for example, by means of a heatable lower mold 16. If the hot-melt adhesive film 20 is, for example, polyurethane, a temperature of roughly 95 to 150° is advantageous, the heat-up phase possibly lasting about 15 minutes and then the temperature level being held for 30–45 minutes.

Then, the film combination 26 is cooled to room temperature, whereupon the lower chamber 14 can be ventilated in order to remove the glass pane 18 which has been laminated with the film combination 26 from the laminator. The die 24 is pulled off toward the top.

Due to its flexibility, during the lamination process, the laminator membrane 12 is placed against the die 24 which in turn, due to its flexibility, essentially assumes the curvature of the pre-curved glass pane 18. The glass pane 18, in turn, is held accordingly in the mold by the corresponding concave depression in the lower mold 16. The die 24 provides for the necessary distribution of the contact pressure over the entire surface so that neither a bulge nor a depression can occur and so that the elevations or irregularities caused by an element or electrical operating elements which may have been laminated in can be leveled. In this way, a pane arrangement can be produced in which the laminated film combination 26 ensures an optically distortion-free view with high surface quality.

If a pressure of 1 bar is not sufficient for the lamination process, the upper chamber 10 of the laminator after ventilation can be charged with compressed air from a compressor with a pressure of up to 5 bar, by which the die 24 is then pressed accordingly against the film combination 26 with a pressure between 1 and 5 bar.

Figure 2:
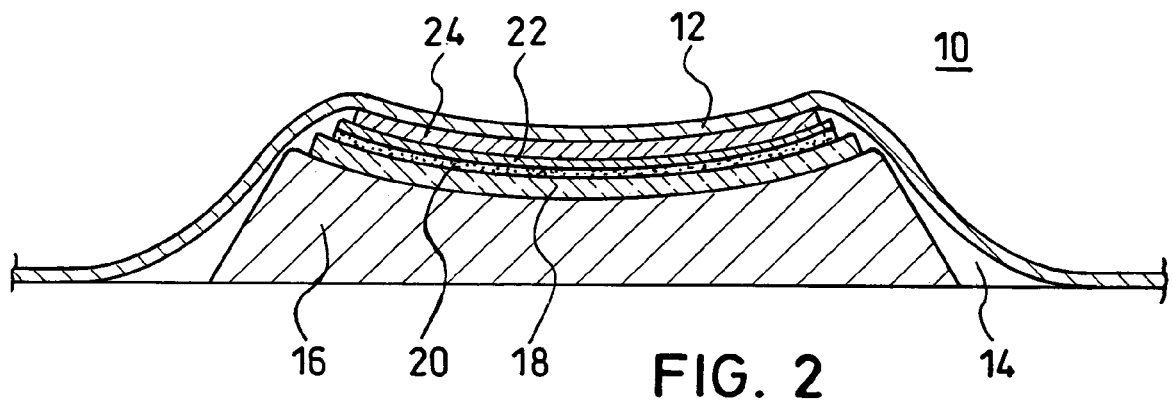
FIG. 2 is a view like FIG. 1, the laminator being shown in the closed state.

FIG. 2 shows the laminator from FIG. 1 during the lamination process when the upper chamber 10 is ventilated while the lower chamber 14 is evacuated.

FIG. 3 shows a measure for facilitating the discharge of air during evacuation, strips of glass fiber mat 30 are placed on the glass pane 18 at the peripheral edges of the film combination 26 in order to facilitate air discharge between the film combination 26 and the pane 18, and in this way, to prevent air inclusions. This approach is especially advantageous when the lamination process is not carried out in a laminator, but instead is performed in a rotary furnace or an autoclave, in this case a lower mold not being used, but the glass pane 18 being placed with the film combination 26 and the die 24 in a vacuum bag which is then sealed vacuum-tight and pumped out. The vacuum bag is then heated in the evacuated state in an autoclave or in a rotary furnace, for example, to 95° C. to 150° C., and in the case of using an autoclave, is exposed to a pressure of, for example, 6 to 12 bar, in order to carry out the lamination process.

Instead of a vacuum bag, a so-called vacuum lip ring can also be used, its being a hose here which has a slot on the inside and which is pulled onto the glass pane with the film combination, the lips providing for vacuum-tightness so that the vacuum lip ring can be evacuated in a manner similar to the vacuum bag.

FIG. 4 shows an embodiment which has been modified relative to the embodiment of FIG. 1, and in which a cover film 22 is applied to the die 24 before the start of the evacuation and lamination process. The hot-melt adhesive film 20 is conversely placed as in FIG. 1 on the glass pane 18. The film combination 26 is formed, in this case, only when the die 24 with the cover film 22 is placed on the glass pane 18 or the hot-melt adhesive film 20.

Figure 5:
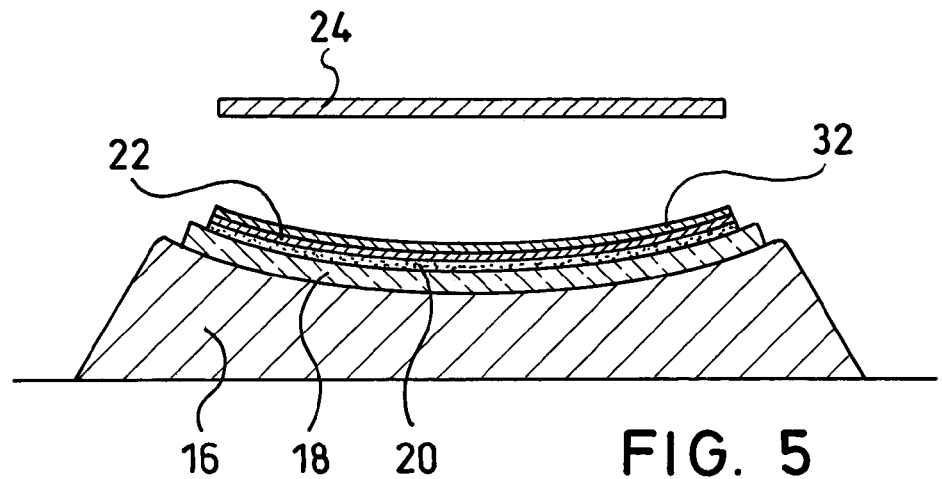
FIG. 5 is a view like FIG. 4, but of an embodiment of the film stack which is modified compared to that shown in FIG. 4.

FIG. 5 shows another version of the embodiment from FIG. 1, here, as in FIG. 1, the cover film 20 is placed on the hot-melt adhesive film 22, which has been placed on the glass pane 18, before the die 24 is placed on the film combination 26, but the side of the cover film directed towards the die 24 is provided with a lining layer 32 which, after completed lamination, can be withdrawn from the film combination 26 after removing the die 24. By means of the lining layer 32, it can be ensured that no impurity particles are laminated into the cover film 22 since these impurity particles are held instead of those of the coated layer and after completed lamination are removed together with them. In this way, adverse effects on the surface of the film combination 26 can be prevented.

Figure 6:
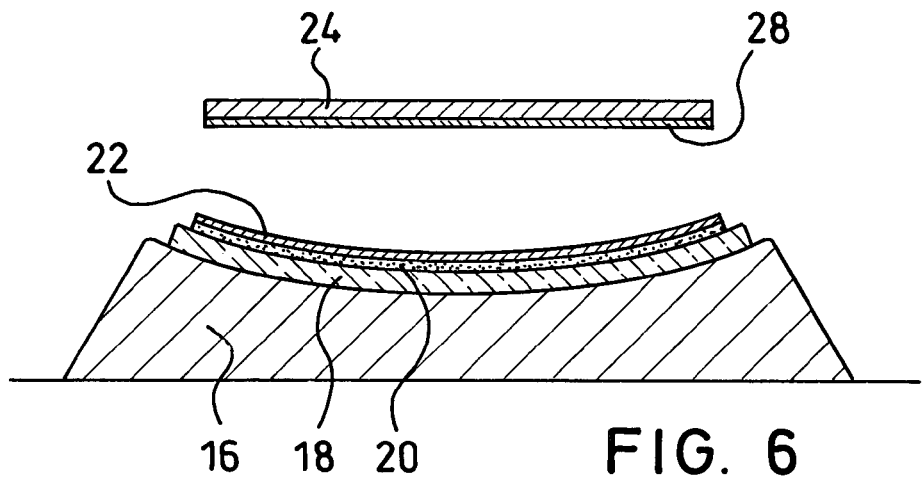
FIG. 6 shows a view like FIGS. 4 and 5, but of an embodiment of die and the film stack which is modified compared to FIGS. 4 and 5.

FIG. 6 shows a partially already mentioned version of the embodiment from FIG. 1, in which the die 24, on the side facing the film combination 26, is provided with a coating 28. As already mentioned, it can be a metallic coating for purposes of electrical grounding of the die 24, or an anti-adhesion coating. But furthermore, it can also be an elastic coating. This elastic coating 28 can be used not only for thin glass dies, but also for metal foil dies or also for rigid dies.

Figure 7:
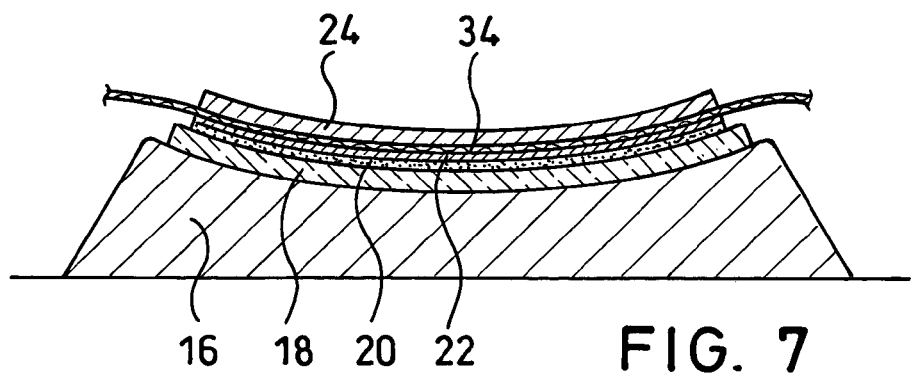
FIG. 7 shows a view like FIG. 1, but of an embodiment which has been modified compared to FIG. 1.
Figure 8:
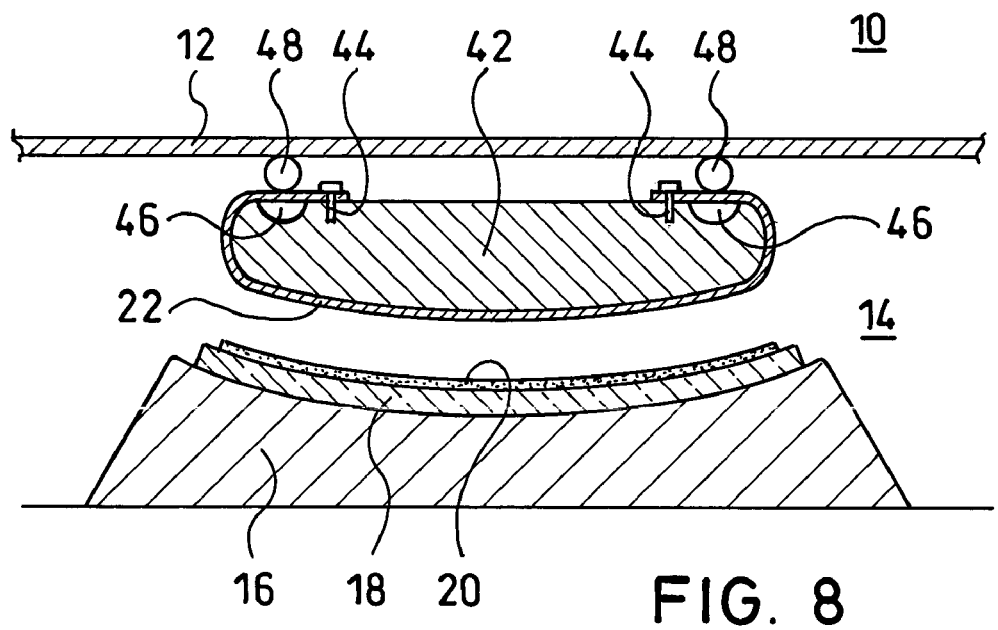
FIG. 8 shows a view like FIG. 4, but instead of a flexible die, a rigid top mold is shown being used on which the plastic film is clamped.
Figure 9:
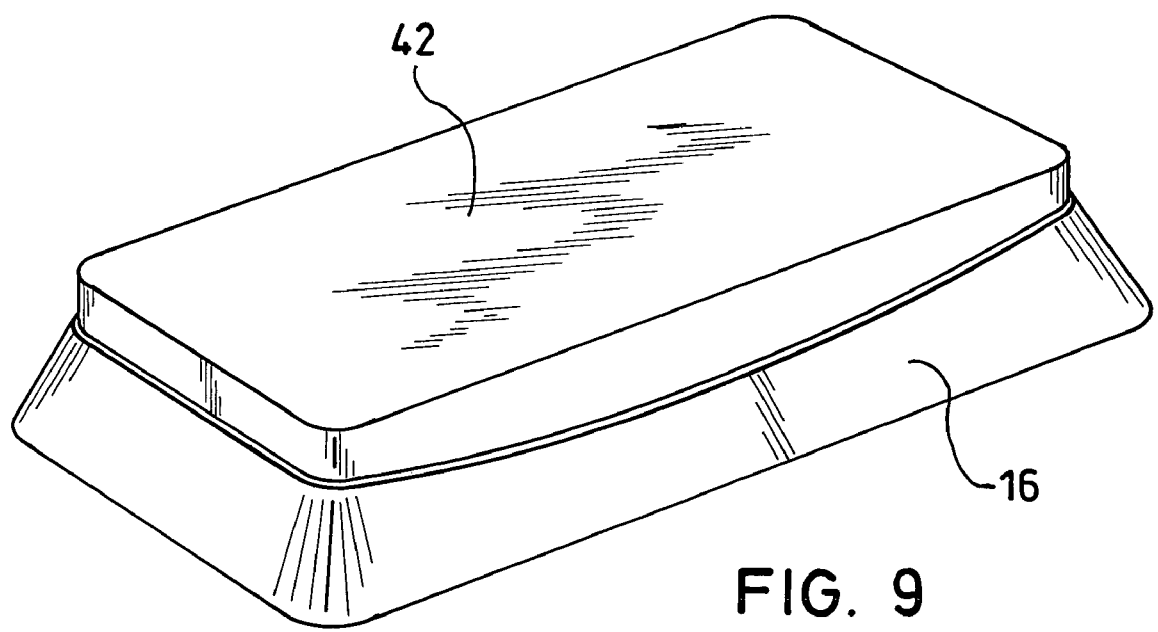
FIG. 9 shows a schematic perspective of one example for the use of a rigid top mold instead of a flexible die.

FIG. 7 shows a measure by which air inclusions between the die 24 and the film combination 26 can be avoided. Here, before the die 24 is placed, a layer 34 which is provided with a surface microstructure is placed on the film combination 26. In this way, the layer 34 comes to rest between the die 24 and the film combination 26. The surface microstructure is so fine that it does not show on the cover film 22 during lamination, but during evacuation enables improved air discharge between the die 24 and the film combination 26. The layer 34 can be preferably a nonadhering crisp fabric, for example, crisp silk. After completion of the lamination process, the layer 34 together with the die 24, can be removed from the film combination 26.

Figure 10:
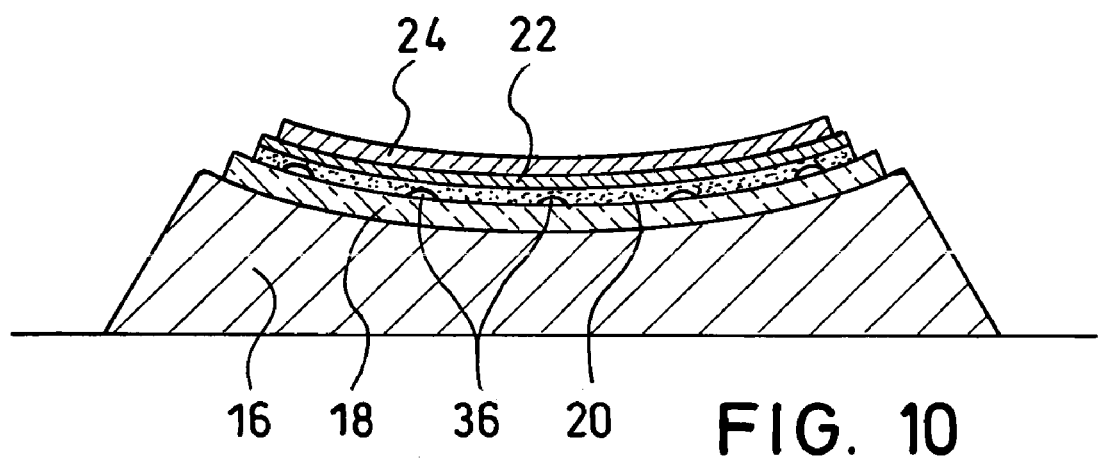
FIG. 10 shows a view like FIG. 1, but with electrical operating elements applied to the pane being laminated in at the same time.

FIG. 10 shows an embodiment which has been modified relative to the embodiment in FIG. 1, and in which, before placing the film combination 26 on the glass pane 18, the side of the glass pane 18 facing the film combination 26 is provided with electrical operating elements 36 which are applied preferably directly to the glass pane 18. Here, they can be especially lighting means such, as light emitting diodes, including one or more layers provided with electrical feed lines.

Figure 11:
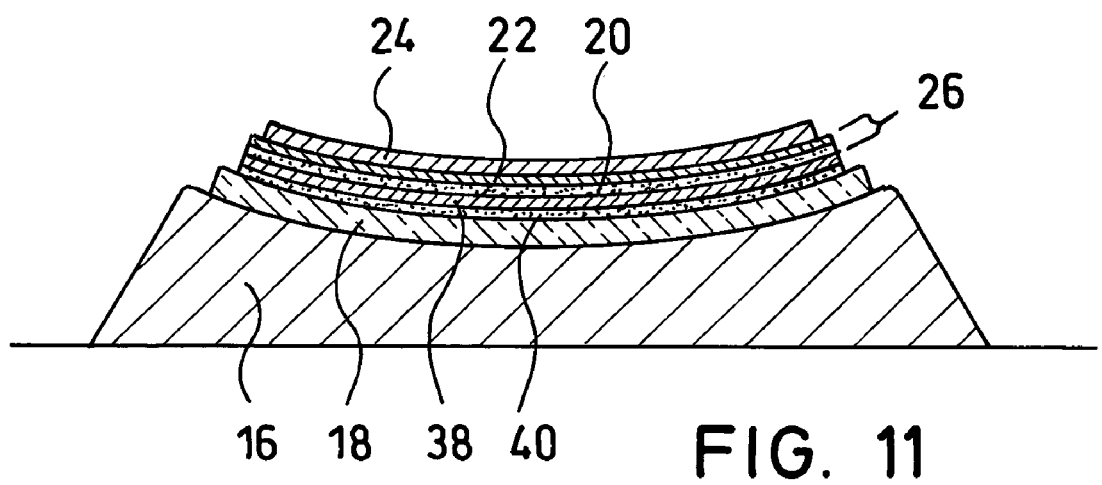
FIG. 11 shows an alternative to the embodiment of FIG. 10, an electrical working film being laminated in at the same time.

FIG. 11 shows one modified embodiment in which, instead of electrical operating elements 36, an electrical working film 38 is inserted between the film combination 26 and the glass pane 18. In particular, it can be a LCD or SPD film which is laminated in between the pane 18 and the film combination 26 during lamination. Feasibly, there can be a second adhesive layer 40 between the working film 38 and the glass pane 18.

Instead of applying an electrical working film to the pane 18 by means of such an additional adhesive layer 40, a corresponding electrical operating layer could also be applied directly to the surface of the glass pane 18.

What is claimed is:

1. Process for producing an arched pane arrangement for a motor vehicle, comprising the steps of:
    pressing a textured surface of a plastic film onto an arched glass pane by means of a first die with a textured surface in order to form a film combination, and
    subjecting the film combination to a first heat treatment at a pressure which is below atmospheric pressure, and subjecting the film combination to a second heat treatment, at a pressure which is below atmospheric pressure to laminate the plastic film onto the pane, said first die being on the film combination during producing of said pressure which is below atmospheric pressure and during said heat treatments, wherein the plastic film is pressed by means of a second die with a smooth surface onto the arched pane for removing textures stamped by the textured surface of the first die into the film combination.

2. Process as claimed in claim 1, wherein the laminated glass pane is a cover for a vehicle roof opening.

* * * * *